United States Patent [19]

Kispert et al.

[11] Patent Number: 5,039,231
[45] Date of Patent: Aug. 13, 1991

[54] BEARING CAGE

[75] Inventors: Klaus Kispert; Armin Olschewski, both of Schweinfurt; Ernst Wahler, Sennfeld; Harald Woerner, Scheinfurt, all of Fed. Rep. of Germany

[73] Assignee: SKF GmbH, Schweinfurt, Fed. Rep. of Germany

[21] Appl. No.: 561,446

[22] Filed: Aug. 1, 1990

[30] Foreign Application Priority Data

Aug. 2, 1989 [DE] Fed. Rep. of Germany ....... 3925512

[51] Int. Cl.⁵ .................. F16C 33/46; F16C 33/49
[52] U.S. Cl. .................................... 384/572; 384/577
[58] Field of Search ............... 384/572, 573, 575, 576, 384/577, 523, 526

[56] References Cited

U.S. PATENT DOCUMENTS

| 612,472 | 10/1898 | Woodcock | 384/575 |
| 3,353,881 | 11/1967 | Steinert | 384/577 |
| 3,720,450 | 3/1973 | Dominik | 384/572 |

FOREIGN PATENT DOCUMENTS

| 1386534 | 12/1964 | France | 384/577 |
| 76720 | 6/1981 | Japan | 384/577 |
| 271865 | 11/1927 | United Kingdom | 384/572 |
| 1604570 | 5/1978 | United Kingdom | |

Primary Examiner—Thomas R. Hannon
Attorney, Agent, or Firm—Eugene E. Renz, Jr.

[57] ABSTRACT

In a roller bearing cage which holds the set of rollers in the raceway of aninner ring to form a structural unit, the lateral rings are interrupted by slots. Webs extend between the lateral rings. In this way, the cage gives way radially, which makes it possible to push the rollers over one of the flanges of the inner ring to assemble the bearing. To stabilize the cage during operation, projections are provided on the webs, which, as needed, contact the raceway of the outer ring and secure the radial position of the webs.

6 Claims, 3 Drawing Sheets

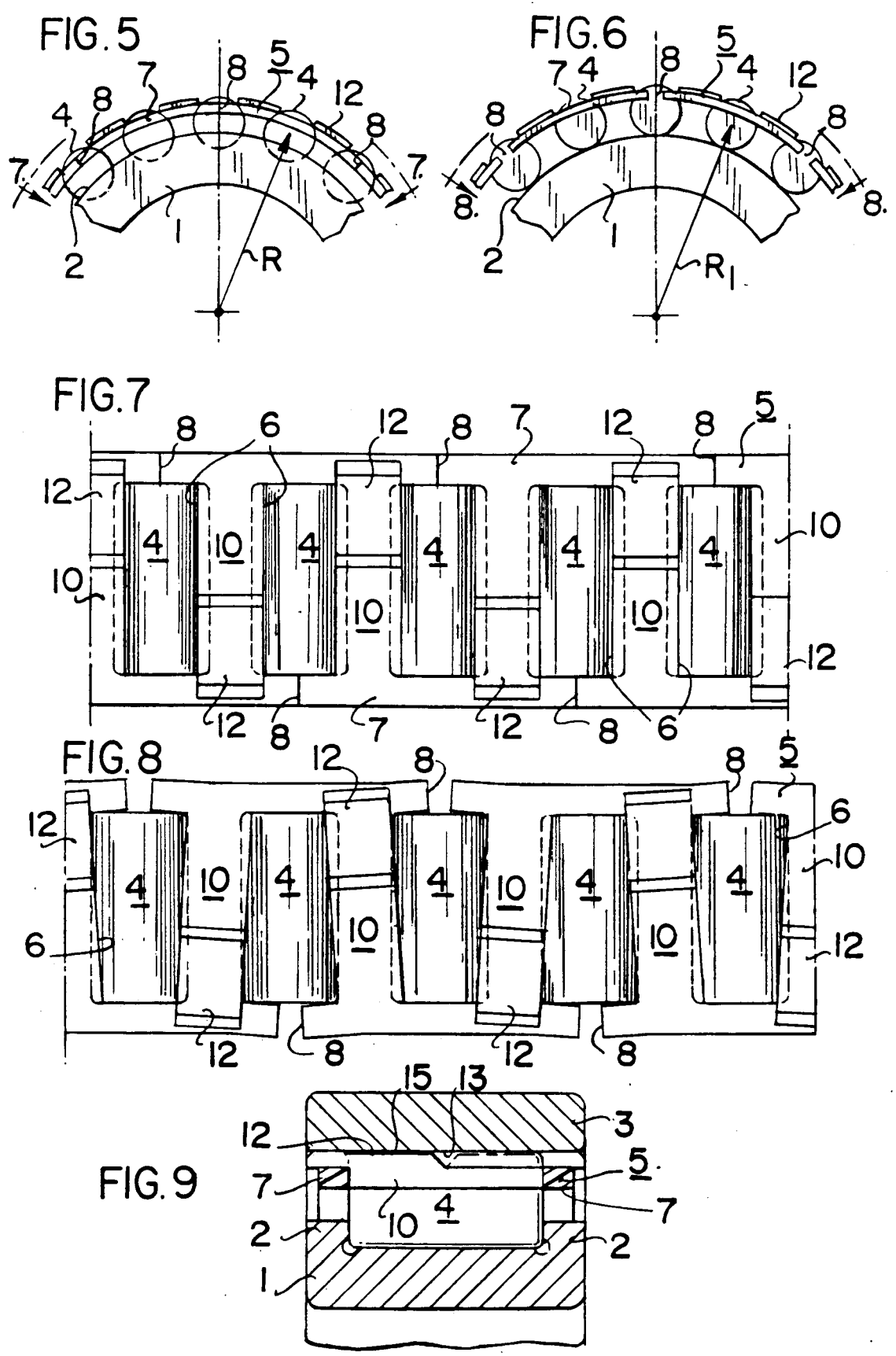

BEARING CAGE

FIELD OF THE INVENTION

The present invention relates to improvements in roller bearing cages.

BACKGROUND OF THE INVENTION

In the roller bearing art, it is commonplace that the inner ring, the set of rollers and the cage often form an integral structural unit to facilitate assembly and transport where the parts are formed in such a manner that they do not disassemble. Thus, the inner ring is provided with flanges and the cage serves to retain the rollers in the radial direction. When the rollers cannot be inserted radially from the outside into the pockets as is the case, for example, in an arrangement where the cage is located outside the pitch circle of the set of rollers, the structural unit can no longer be assembled. In this instance, the pockets are smaller than the longitudinal profile of the rollers. However, in spite of this structural configuration, it may be possible to insert the rollers over the flange of the inner ring provided the flange is the proper height so that the cage can yield at least at some appropriate point.

A cage meeting the above identified description which functions in the manner described is known from British Patent No. 1,604,570. In accordance with one of the embodiments shown in this British Patent, one of the lateral rings, is interrupted by slots in the area of every other pocket. The sections so formed can therefore be spread radially apart via the webs and consequently the set of roller can escape radially on the side of the cage in question when they are pushed over the flange of the inner ring. It has been observed, however, that a roller bearing assembled in this way is at considerable risk because of the lack of stability of the cage resulting from the slotted radial ring. This is particularly true for sheet metal cages made of relatively thin material or plastic cages wherein the webs yield in the outward radial direction under the load of the rollers and thus lose their separating function.

SUMMARY OF THE INVENTION

With the foregoing in mind, it is an object of the present invention to provide an improved cage of the general type described which is characterized by novel features of construction and arrangement so that after assembly via the flange of the bearing ring, the uniform and reliable separation of the rollers is guaranteed during operation. To this end, in accordance with the present invention, projections are provided on the webs in the areas of the slotted lateral ring or on the lateral ring sections themselves. The projections are directed to point toward the outer ring of the roller bearing and serve to retain the webs in an operating position.

The cage is preferably made of plastic. However, the structural details and the arrangement of the cage of the present invention can also be implemented in a sheet metal cage. Consider now a cage in accordance with the present invention for an angular roller bearing. In this event, the cage has a conical profile and the lateral ring with the smaller diameter is in this instance provided with several slots uniformally distributed about its periphery. By this construction, the lateral ring is divided into sections which are capable of moving outwardly by reason of the elasticity of webs and of the continuous unbroken lateral ring. In the operating position, the peripheral ends of the lateral ring sections touch each other so that an apparently closed lateral ring is formed. In this way, the webs are automatically stabilized in the inward radial direction. The projections in accordance with the present invention produce stabilization in the outward radial direction. Projections are preferably provided on each web and situated in the area of the slotted lateral ring and they extend, for example, over one third of the length of the web and can also continue beyond the associated section of the web or be limited to this section alone. In all instances, they support the webs against the raceway of the outer ring when the webs give way radially outwardly under load during operation. Under these conditions, the cage according to the present invention is almost as stable as one with two closed lateral rings.

Consider assembly of the elements of the bearing assembly in accordance with the present invention. During assembly, before the outer ring has been pushed on, the lateral ring section with the webs and the projections can give way radially to the outside. Thus, the rollers also can give way with the result that the cage with the inserted rollers can be pushed easily over the flange on the inner ring. By reason of the spring action of the webs and of the closed lateral rings, the cage automatically assumes its operating position after the rollers have taken up their correct position on the raceway and behind the flange.

In accordance with another feature of the present invention, the projections are located near the raceway of the outer ring. As a result they can slide if necessary along a precisely machined surface. However, it is also possible to design the edge area of the bearing ring as a contact surface and to allow the projections to extend a corresponding distance beyond the lateral ring in question.

The advantages of the features according to the invention can be used not only for angular roller and conical roller bearings but also for cylindrical roller bearings.

BRIEF DESCRIPTION OF THE DRAWINGS

These and other objects of the present invention and the various features and details of the operation and construction thereof are hereinafter more fully set forth with reference to the accompanying drawings, wherein:

FIG. 5 is a fragmentary side elevational view of a cylindrical roller bearing with the outer ring removed and showing the rollers held in place by means of a cage within the flanges of the inner ring;

FIG. 6 is a fragmentary side elevational view similar to FIG. 5 but showing the pitch circle of the rollers increased to allow the rollers to pass over the outer edge of the inner ring flange and the cage expanded to accommodate this assembly;

FIG. 7 is an enlarged fragmentary development plan view of the cage of the present invention taken on the line 7—7 of FIG. 5.

FIG. 8 is an enlarged fragmentary development plan view of the cage taken on the line 8—8 of FIG. 6; and FIG. 9 is a transverse sectional elevational view illustrating a modified cage construction having stabilizing projections that extend beyond the lateral rings of the cage and are in contact with the bearing ring.

DETAILED DESCRIPTION OF THE PREFERRED EMBODIMENTS

Figure 1:
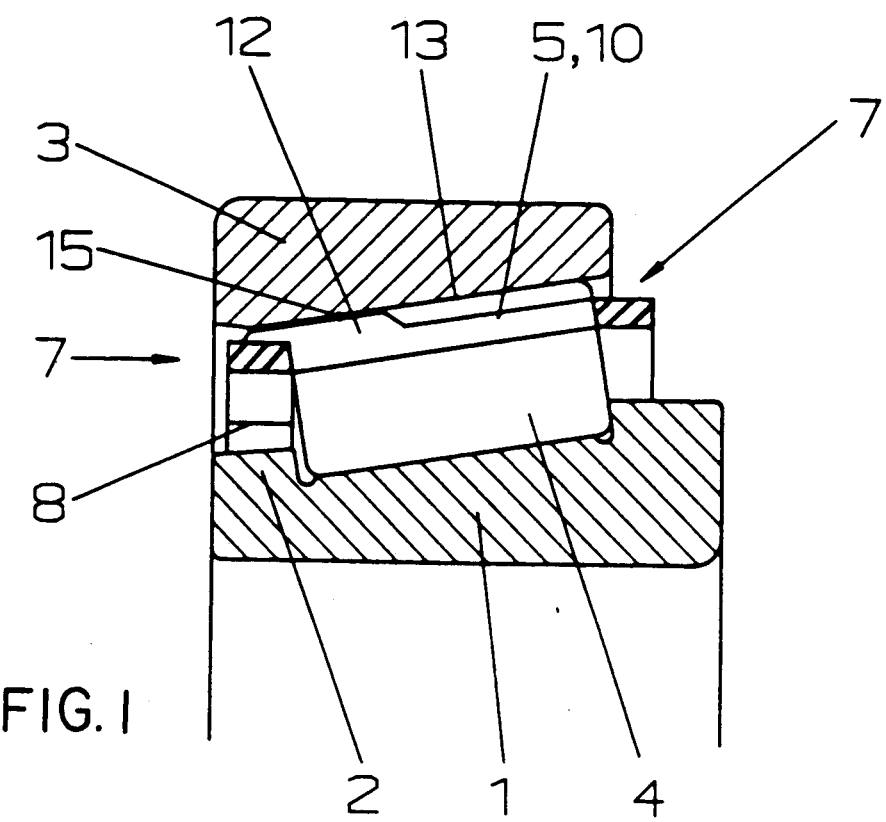
FIG. 1 is a partially longitudinal section through an angular roller bearing constructed in accordance with the present invention and incorporating a cage provided on one side with slots and projections.
Figure 2:
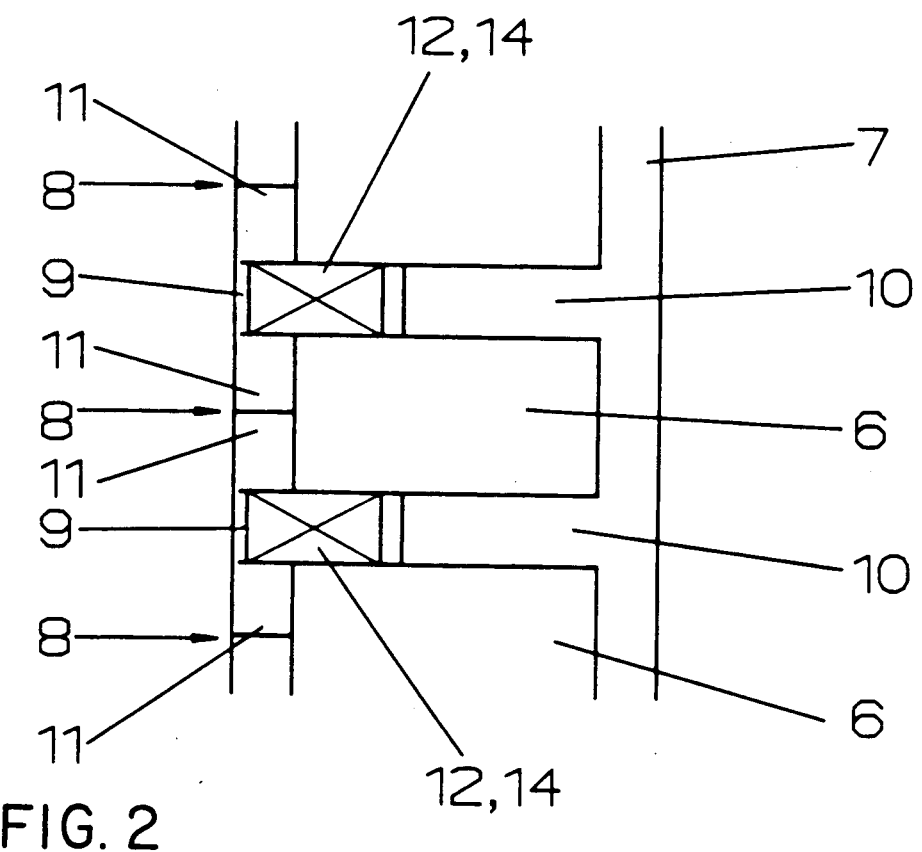
FIG. 2 is a partial top view of the cage according to FIG. 1 in a developed state.

Referring now to the drawings, and particularly FIGS. 1 and 2 thereof, there is illustrated an embodiment of an angular roller bearing in accordance with the present invention comprising an inner ring (1) having radially outwardly directed flanges (2) and (2a) on opposite sides of the raceway (1a), a flanged outer ring (3), a set of rollers (4) and cage (5) which maintains the rollers in a circumferentially spaced relationship and is located between the rings. Cage (5) has a diameter larger than the mean pitch circle of the set of rollers (4). Consequently, pockets (6) are smaller in the peripheral direction of the angular contact bearing than the diameter of the rollers. Thus, each roller is held in radially. Moreover, the inner ring (1), set of rollers (4) and cage (5) even without the outer ring form a compact integral structural unit where individual parts are retained and it does not fall apart into its individual components.

Considering now the assembly of the elements described above, rollers (4) cannot be insert radially from the outside since the pockets (6) are narrower than the diameter of the roller to produce the indicated retaining function of the cage. Accordingly, it is possible to push the cage (5), with the rollers (4) inserted, radially from the inside over the smaller flange (2) after the outer ring (3) has been removed. It is noted that the right ends of the rollers (4) are able to pass over the flange (2) but that movement becomes impossible when the centers of the roller (4) reach the left end of the flange (2). In order to facilitate complete assembly of the rollers by continued lateral displacement, the left lateral ring (7) of cage (5) is provided with slot (8) in the area of each pocket (6). By this arrangement, lateral ring section (9) thus formed can spread radially outwardly via the webs (10) which give way elastically. This procedure expands pocket (6) in the peripheral direction. Consequently, rollers (4) can also escape radially outwardly and can easily slide over the flange (2) into the operating position as shown in FIG. 1. At this point, the peripheral ends (11) of lateral ring section (9) rest against each other and stabilize the form of the cage. The webs (10) which separate the rollers (4) from each other are therefore incapable of shifting any further inwardly in the radial direction.

The ends of webs (10) connected to the lateral ring section (9) are provided with radially outwardly directed projections (12) which extend over a predetermined part of the lateral ring section (9) to achieve stabilization in the outward radial direction as well. The projections have partial peripheral surface area sections conforming to raceway (13) of outer ring (3) and which are designed as arcuate contact surfaces (14). As can be seen in FIG. 1, in the bearing's operating state there is a small clearance or gap (15) between the contact surface (14) and the raceway (13). The projections (12) prevent webs (10) from outward radial displacement during operation.

Figure 3:
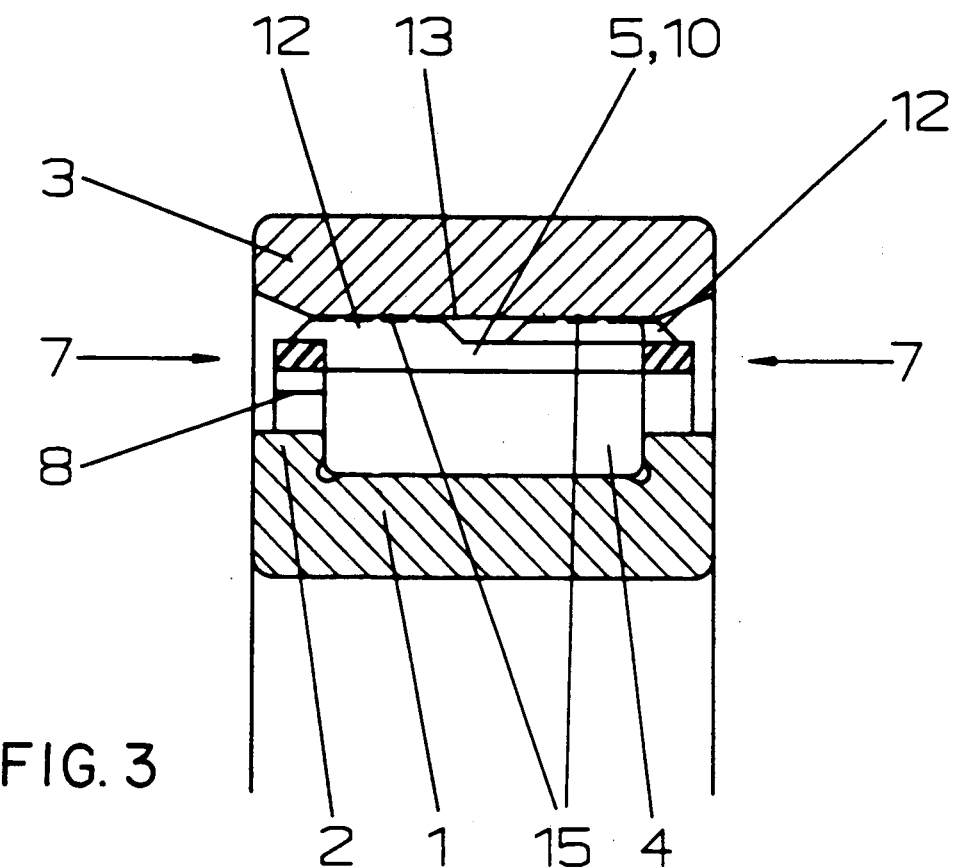
FIG. 3 is a partial longitudinal section through a cylindrical roller bearing with a cage provided with slots and projections alternating from side to side constructed in accordance with the present invention.
Figure 4:
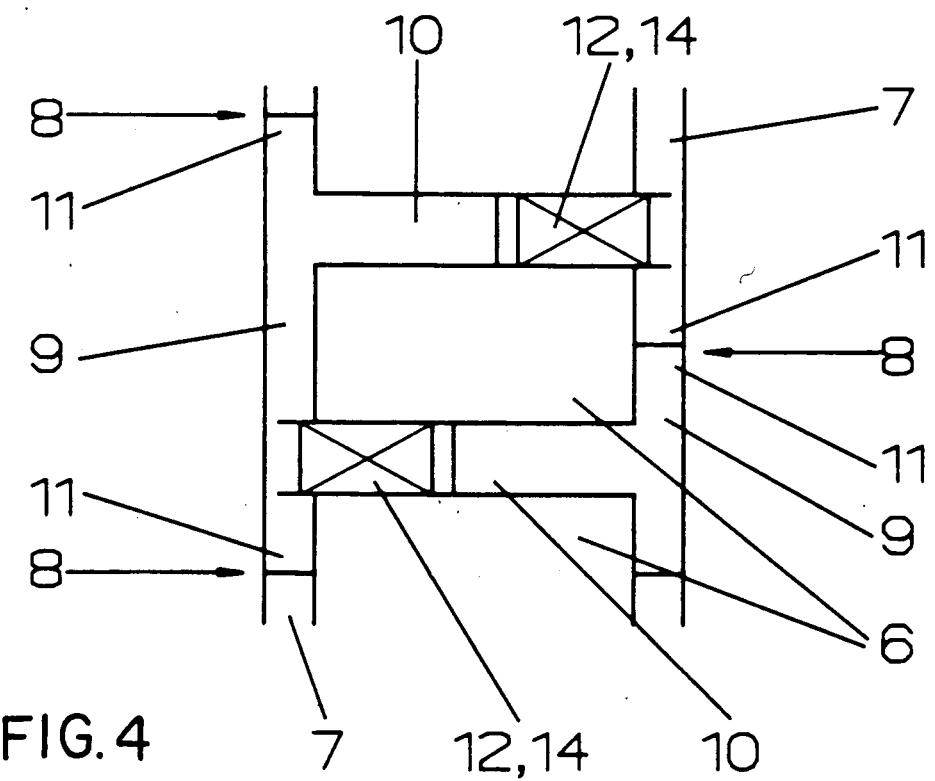
FIG. 4 shows a partial top view of the cage according to FIG. 3 in a developed state.

There is shown in FIGS. 3 and 4 another bearing assembly constructed in accordance with the present invention. The assembly illustrated is a cylindrical roller bearing. Like parts have been designated with the same reference numerals. However, in this instance, the raceways are parallel to the axis of the bearing. In accordance with this embodiment of the invention, when it is intended to push the rollers over one of the flanges (2) of the inner ring during assembly with the outer ring removed, it must be possible for the set of rollers (4) to displace radially outwardly over the entire length of the rollers (4). To this end, the two lateral rings (7) are provided alternately with slots (8) in the area of successive pockets (6). The webs (10) are also provided in an alternating manner with projections (12) configured as described above in connection with the embodiment of the invention illustrated in FIGS. 1 and 2. By this arrangement cage (5) can therefore be expanded over the entire periphery as a result of which rollers (4) can be displaced to a larger pitch circle and thus are able to pass over the flanges. As in the preceding embodiment, the projections (12) stabilize the cage (5) in its operating position.

While particular embodiments of the present invention have been illustrated and described herein, it is not intended to limit the invention and changes and modification may be made therein within the scope of following claims.

What is claimed is:

1. Cage for a roller bearing to hold a set of rollers on a bearing ring comprising, two lateral rings, at least one of said lateral rings being divided by axial slots into lateral ring sections (9), webs (10) extending between said lateral rings, defining successive pockets said webs and slots permitting said lateral ring sections to spread radially outward, projections (12) on at least said webs (10) pointing toward an outer ring (3) of said roller bearing and retaining said webs (10) in their operating position.

2. Cage according to claim 1 wherein projections are also provided on said lateral ring sections (9).

3. Cage according to claim 1, characterized in that said projections (12) are located near a raceway (13) of said outer ring (3).

4. Cage according to claim 3, further characterized in that said projections (12) and said raceway (13) form a gap (15) in the operating position of the cage (5).

5. Cage according to claim 1, characterized in that at least one of in its place lateral rings (7) is provided with slots (8) in the central peripheral section of each pocket.

6. Cage according to claim 1, characterized in that the two said lateral rings (7) are provided alternately in the peripheral direction with slots in the area of the successive pockets (6), and in that said webs (10) are provided in an alternative manner with projections (12) in the area of at least one of said lateral rings (7).

* * * * *